(12) United States Patent
Krishnamurthy et al.

(10) Patent No.: US 11,194,302 B2
(45) Date of Patent: Dec. 7, 2021

(54) VIRTUALIZING BUILDING MANAGEMENT SYSTEMS

(71) Applicant: Candela Iot Inc., Mountain View, CA (US)

(72) Inventors: Karthik Krishnamurthy, Mountain View, CA (US); Nikhil Sriraman, Mountain View, CA (US)

(73) Assignee: Candela IoT Inc., Mountain View, CA (US)

( * ) Notice: Subject to any disclaimer, the term of this patent is extended or adjusted under 35 U.S.C. 154(b) by 0 days.

(21) Appl. No.: 16/520,016

(22) Filed: Jul. 23, 2019

(65) Prior Publication Data
US 2020/0033821 A1 Jan. 30, 2020

Related U.S. Application Data

(60) Provisional application No. 62/702,777, filed on Jul. 24, 2018, provisional application No. 62/753,706, filed on Oct. 31, 2018, provisional application No. 62/815,896, filed on Mar. 8, 2019.

(51) Int. Cl.
*G05B 15/02* (2006.01)
*G06F 16/904* (2019.01)
*G06F 9/54* (2006.01)

(52) U.S. Cl.
CPC ............ *G05B 15/02* (2013.01); *G06F 9/54* (2013.01); *G06F 16/904* (2019.01)

(58) Field of Classification Search
None
See application file for complete search history.

(56) References Cited

U.S. PATENT DOCUMENTS

| 7,222,136 B1* | 5/2007 | Brown | G06F 16/2358 707/683 |
| 2012/0079559 A1* | 3/2012 | Reznik | H04L 63/105 726/1 |
| 2014/0032850 A1* | 1/2014 | Phelan | G06F 12/0873 711/135 |
| 2019/0094827 A1* | 3/2019 | Park | G05B 15/02 |

OTHER PUBLICATIONS

M. Tosic, et al., "SDN based service provisioning management in smart buildings," 2016, MIPRO 2016, pp. 754-759, retrieved from https://ieeexplore.ieee.org/stamp/stamp.jsp?tp=&arnumber=7522241 on Jun. 16, 2020. (Year: 2016).*
Ardehali, M. M., et al., Building Energy Use and Control Problems: An Assessment of Case Studies, 2003, pp. 111-121, ASHRAE Transactions 109.

(Continued)

*Primary Examiner* — Chat C Do
*Assistant Examiner* — William C Wood
(74) *Attorney, Agent, or Firm* — Chip Law Group

(57) ABSTRACT

Methods and apparati for virtualizing building management systems. An apparatus embodiment comprises a first API for accessing on-premise building management systems; coupled to the first API, a virtualization engine configured to receive and deploy commands to the first API; and coupled to the virtualization engine, a second API configured to receive and deploy commands to the virtualization engine.

20 Claims, 12 Drawing Sheets

(56) References Cited

OTHER PUBLICATIONS

Brambley, M.R., et al., Advanced Sensors and Controls for Building Applications: Market Assessment and Potential R&D Pathways, U.S. Dept. of Energy Contract DE-AC05-76RL01830, Apr. 2005.
Commercial Buildings Energy Consumption Survey, Table B1. Summary table: total and means of floorspace, number of workers, and hours of operation, 2012, Release Date Feb. 2015.
Table 2.1 Primary Energy Consumption by Source. U.S. Energy Information Administration, Primary Energy Consumption, 2015.
Energy Consumption by Sector, Table 2.1. Monthly Energy Review., U.S. Energy Information Administration, eia.gov Energy Consumption by Sector 2018, May 2018.
Friedman, H, et al., Persistence of Benefits from New Building Commissioning, In Proceedings of the 2002 ACEEE Summer Study, Pacific Grove, CA.
Sool Yeon Cho, (advisors: Turner, D., D. Claridge, Jeff Haberl, John Weese). "The Persistence of Saving Obtained from Continuous Commissioning of Existing Buildings", Masters Thesis, Mechanical Engineering, May 2002.
Kumar, S. et al., Development of Parameter Based Fault Detection and Diagnosis Technique for Energy Efficient Building Management System, Energy Conversion and Management 42 (2001) 833-854.

\* cited by examiner

VIRTUALIZING BUILDING MANAGEMENT SYSTEMS

RELATED PATENT APPLICATIONS

The present patent application claims the benefit of U.S. provisional patent application 62/702,777 filed Jul. 24, 2018, U.S. provisional patent application 62/753,706 filed Oct. 31, 2018, and U.S. provisional patent application 62/815,896 filed Mar. 8, 2019.

BACKGROUND OF THE INVENTION

Field of the Invention

This invention relates to energy management, specifically to management of building energy systems via cloud-based systems.

Description of Related Art

Environmental sustainability is one of the twenty first century's existential goals. Given the breadth and depth of the problem to achieve sustainability, academic researchers and industry practitioners have been pursuing many paths, from big, disruptive ideas (including new forms of energy generation such as thorium nuclear generation) to smaller but surer initiatives such as energy conservation.

Building energy optimization offers an impactful and readily addressable opportunity for reducing energy consumption in commercial buildings. The good news is that owners/operators of commercial properties (building operators) have comprehended the financial and societal impact of energy efficient buildings and have been investing significantly in energy management systems that include both energy management hardware devices (such as sensors and controllers) and software systems (such as air handling unit controllers and lighting controllers) to be master-controllers for these installed devices. Sensors and controllers have improved building energy usage. In addition, building operators have, over the past decade, invested in on-premise Building Management Systems (BMSs) such as Niagara and Metasys, to centrally operate these sensors and controllers within each building.

The not so good news is that building systems, even with energy management investments, continue to operate with significant inefficiencies. Some of these inefficiencies result from the poor capture of building usage requirements at the time of initial startup. Yet other inefficiencies are due to suboptimal configurations that arise during ongoing building operations from changes in occupancy patterns and modifications to technical infrastructure (such as commissioning of new building subsystems and/or upgrades to hardware and software components).

One of the approaches that BMS have attempted to employ to address these inefficiencies is through "pure play" cloud BMS solutions. Cloud solutions are inherently scalable and support remote access to re-configure the systems and setting of a building.

However, such "pure play" cloud solutions replicate in the cloud existing on-premise BMS functionalities, causing three significant limitations of their own. First, "pure play" cloud solutions make redundant existing on-premise BMS investments, causing investment losses. Second, building subsystems need to be manually weaned away from on-premise BMS implementations, requiring complicated migration activities and risking possible downtimes. Third, and perhaps most critical, "pure play" cloud solutions will likely need to redo expensive and time-consuming integrations with building subsystems and actual devices within buildings (such as sensors and controllers). Many of these building subsystems are reachable only through legacy networks and proprietary protocols, making the rebuilding of these integrations cost-prohibitive and time-consuming.

Hence, adroit solutions are needed to address the inefficiencies of traditional BMSs while sidestepping the shortcoming of pure play approaches. Such solutions are described below.

SUMMARY OF THE INVENTION

The present invention comprises methods and apparati for virtualizing building management systems. An apparatus embodiment comprises a first API (application programming interface) for accessing on-premise building management systems; coupled to the first API, a virtualization engine configured to receive and deploy commands to the first API; and coupled to the virtualization engine, a second API configured to receive and deploy commands to the virtualization engine.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

Figure 1:
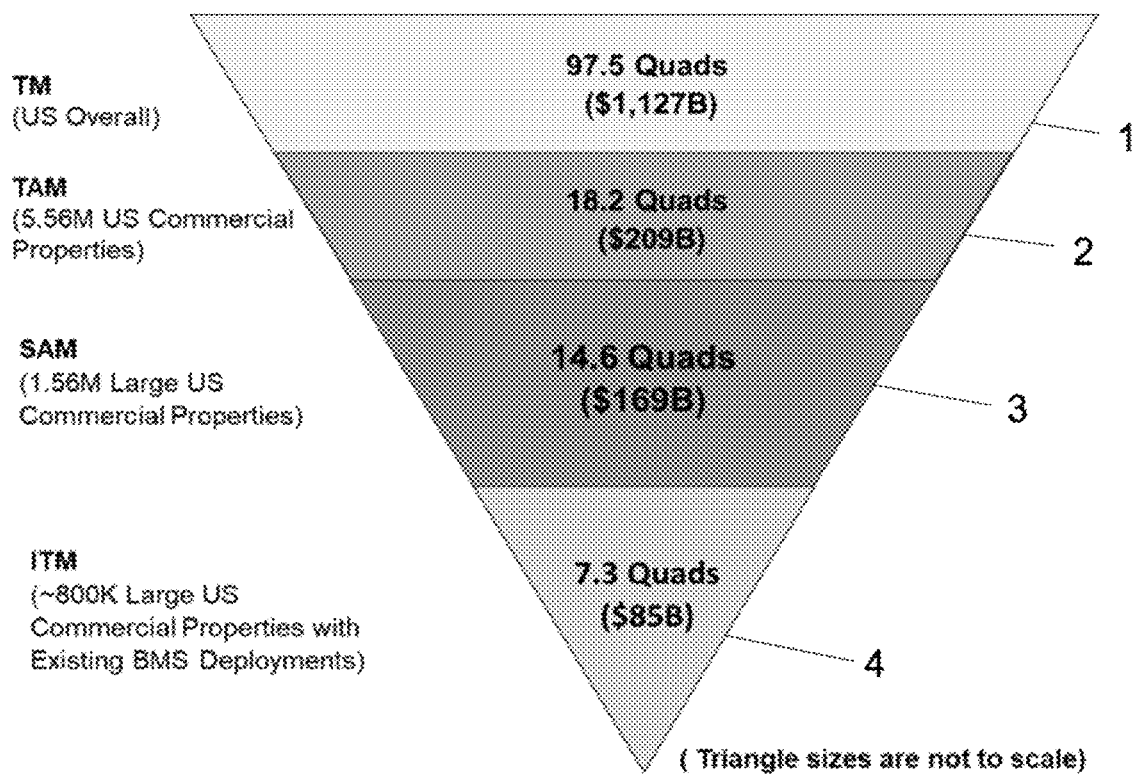
FIG. 1 illustrates the energy consumption market by large commercial properties with existing BMS implementations.

The systems and methods disclosed herein relate to the improvement of building management systems and campuses by addressing current inefficiencies and shortcomings in today's systems. The realized benefits from the approaches we provide include several tangible improvements from increased capabilities that include but are not limited to the benefits discussed below.

Illustrative Benefits of the Approaches Described Herein

Building energy optimization offers an impactful and readily addressable opportunity for reducing energy consumption in commercial buildings. Owners/operators of commercial properties (building operators) have recognized this opportunity and have invested significantly in both energy management devices (such as sensors and controllers) and systems (such as Building Management Systems, BMS) to be master-controllers for these installed devices.

Industry analysis have conservatively shown an opportunity of 5-15% energy savings in commercial properties that could be realized by optimizing current BMS configurations [Brambley 2005, Ardehali. 2003; Ardehali and Smith 2002]. Significant BMS misconfigurations causing sub-optimal performance arise from ongoing operational and usage changes (such as from controller hardware upgrades, release of new software versions, occupancy turnover, and changes in property usage patterns). Further, a seminal longitudinal study further found that sustaining gains, especially from modifying software controls, are challenging [Potter 2002]. It is hard to establish systems and processes to systematically track and capture changes to building occupancies and usage patterns. And harder still to incorporate these changes into building configurations.

Techniques such as those described herein are being pioneered and applied by Candela IoT ("Candela"), the assignee of the present application. These techniques realize an energy savings estimate for a potential segment of the market, described as the target market (as further explained below), at 10% (in the middle of industry analysis energy savings ranges), which amounts to annual US industry savings of about $8.5 B. Detailed estimate calculations of this $8.5 B industry savings are described further below in the section entitled Market Energy Gains from GeoBMS.

The improvements by the systems disclosed herein stem in part from the recognition that gains from modifying software controls often do not persist, while hardware modification have more lasting impact. Practitioner insights suggest that this lack of persistence may be due to failures in capturing physical changes in occupancy and usage patterns as changes within software controls (e.g., setpoints, schedules). Other studies have confirmed similar degradation in energy savings, often to the tune of several percent a year [Turner 2001] (which in aggregate translate to a calculated 5-15% overall savings opportunity).

The systems and methods disclosed herein (provided under the commercial name GeoBMS), enable building owners and operators to comprehensively monitor and manage building management systems, including the performance of large, geographically dispersed commercial campuses. Embodiments of the inventive systems include integrations with third party support systems and interconnections to Artificial Intelligence/Machine Learning engines for increased analytics and predictive guidance for optimizing building and campus performance.

Market Energy Gains from GeoBMS

The calculated $8.5 B energy savings opportunity from optimizing building configurations for large US commercial properties is based on three steps:

Step A. Quantifying current energy consumption at large US commercial properties.

Step B. Restricting initial focus to properties with existing BMS deployments.

Step C. Estimating the additive energy consumption savings from ongoing configuration optimization.

We describe each of these steps in further detail below.

Step A. Quantifying Current Energy Consumption at Large US Commercial Properties FIG. 1 provides a summary illustration of market sizing energy consumption and dollar spend. During the calendar year 2015, the US as a country (also referred to as the Total Market or TM item 1) consumed 97.5 quadrillion Btus (Quads) [10]. This translated into a spend of $1,127 B in 2015 US dollars. The Total US Market has been broken into four consumption segments: Commercial, Residential, Industrial and Transportation.

The US Commercial market segment (also referred to as the Total Addressable Market or TAM item 2) consists of 5.56 M commercial properties [4] that collectively consumed about 18.2 Quads, translating into an industry spend of $209 B in 2015 US dollars [6].

Large US commercial properties (with floor space greater than 10K sq ft.) represent roughly 80.5% of US commercial floor space [4]. By correlating energy consumption with floor space, we estimate that these 1.56 M larger commercial properties consumed 14.6 Quads in 2015, translating into an energy spend of about $169 B in 2015 US dollars (also referred to as the Serviceable Addressable Market or SAM Item 3).

Step B. Restricting Initial Focus to Properties with Existing BMS Deployments

The hybrid cloud/on-premise deployment models disclosed herein integrate with individual BMS implementations and the associated on-premise individual sensors and controllers, for instance as found in many commercial buildings. The Initial Target Market (or ITM item 4) includes commercial buildings that have deployed BMSs. Industry studies estimate that about 50% of large US commercial buildings have some form of BMS deployment [3]. Using this estimation, we quantify energy consumed by larger US commercial buildings with BMS capabilities to be roughly 7.3 Quads in 2015, translating into an energy spend of about $85 B in 2015 US dollars.

Step C. Estimating the Additive Energy Consumption Savings from Ongoing Optimization As mentioned above, industry analysts have conservatively shown a 5% to 15% energy savings opportunity for commercial properties by optimizing current BMS configurations [1][2][3] (A few researchers in fact claim even higher energy wastages, in the 20% to 30% range [9]).

For the purpose of market sizing calculations, we estimate that hybrid cloud/on-premise solutions can capture an additive 10% savings, corresponding to the midpoint of the accepted 5% to 15% energy savings range. For the initial target market of $85 B in annual energy spend, this estimate translates into $8.5 B annual savings opportunity. We refer to this savings opportunity as the initial target market opportunity.

Challenges to Conventional Systems Overcome by the Hybrid Model/GeoBMS

Building management systems implemented to date and as disclosed by the prior art are structurally challenged to offer scalable solutions for tracking and optimizing configurations of multiple buildings and campuses. The novel approach provided by the current disclosure addresses structural challenges including:

1. Limited accessibility to on-premise BMS implementations: Incumbent BMSs are often designed as standalone, on-premise systems, making it often challenging to readily monitor and manage building performance remotely. In fact, some of these legacy systems still require operators to be physically onsite when making adjustments to their building configurations. While recent years have seen significant improvements in network connectivity to BMS deployments, many of the current BMS interfaces (including published APIs) remain vendor proprietary. This makes it difficult for building operators to establish a global BMS with centralized dashboards for tracking performance, in real time and across geographically dispersed buildings and campuses. Building operators are instead forced to monitor each building individually.

2. Lack of data consistency: Building configurations and performance data reside primarily within individual BMS implementations. Unfortunately, there are often significant inconsistencies in how data is represented within each BMS implementation, including what data is captured, how the data is schematically represented, and for how long the captured data is stored). This makes it hard to aggregate data across buildings or campuses for advanced and predictive analyses that are essential for optimization. Also, many BMSs restrict access of their data to in-built analytical tools. Many of these in-built tools have not kept pace with the exponential growth in data processing innovations driven by AI and machine learning tools and techniques.

3. Limited stakeholder support: Traditional BMSs are designed primarily for one stakeholder, the building owner/operator (i.e., the root user). Additional users, such as energy consultants, are usually manually assigned access privileges on an as-needed basis. This restrictive authentication model does not support the emerging model of buildings as delivery platforms for connected user experiences. In this emerging model, the number of stakeholders now expands beyond just the owner/operator, and may be dramatically extended to include occupants and commercial tenant managers among others. Occupants can, for instance, customize their own spatial experiences, while commercial tenant managers can now set and enforce building usage policies to better manage energy costs within ever tightening operational budgets. Additionally, multiple stakeholders also create potential conflicts among their diverse requirements, requiring tools for conflict identification and resolution. Traditional BMSs, as presently designed, cannot handle such diverse access privileges (including the resolution of potential conflicts among these diverse stakeholder requirements).

Architecture of Hybrid Cloud/On-Premise Model

Figure 2:
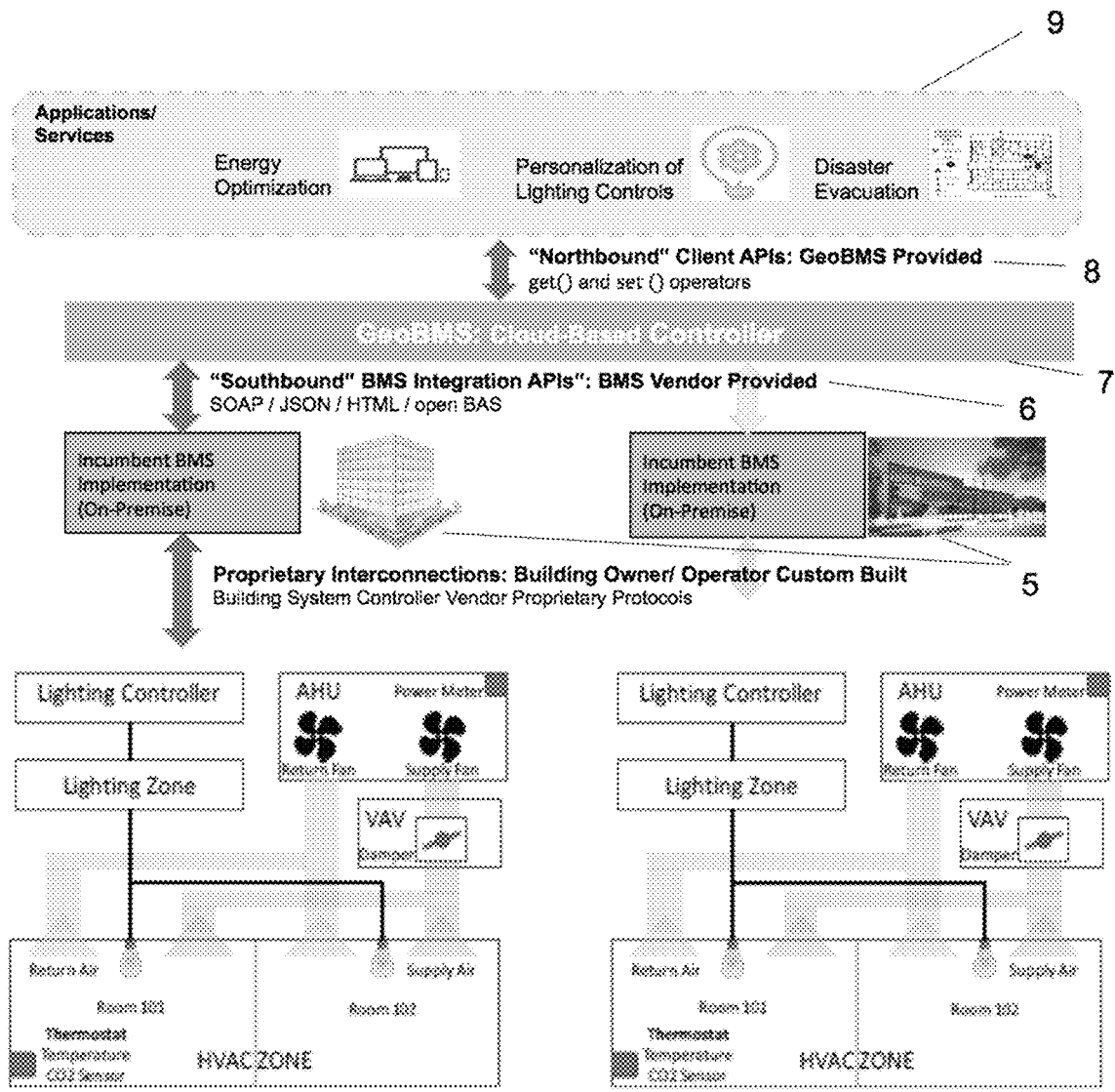
FIG. 2 is an architecture system illustrating the connection with existing BMS systems through a cloud infrastructure platform (GeoBMS) that provides unified APIs to building applications.

The hybrid cloud/on-premise model shown by FIG. 2 integrates into existing BMS implementations item 5 but incorporates the benefits of new cloud technologies. This model employs a cloud-based "middle layer" infrastructure (which we call GeoBMS) item 7 that connects on-premise BMSs to scalable building management applications. The hybrid model addresses each of the identified BMS limitations: remote inaccessibility through virtualization; inconsistent data representation through unified cloud data models; and lack of multi-stakeholder access through global authentication.

The first (bottom) layer of the 3-layer model is the existing Brownfield Implementation item 5, which is what onsite BMS systems are commonly referred to. The model leaves intact current BMS implementations and more importantly the complex interconnections between BMSs and the various building subsystems (including hardware controllers, thermostats, and sensors). By so doing, the hybrid model protects existing BMS investments and avoids any operational disruptions; and importantly avoids the need to rebuild interconnections between BMSs and the individual building subsystems and devices.

While incumbent, on-premise BMS implementations and "Brownfield implementations" item 5 have been used in the present disclosure interchangeably, in some embodiments Brownfield implementations may be used to describe a superset of on-premise BMS implementations as well as the devices that are physically installed in buildings (such as sensors and controllers).

The middle layer item 7 is what the present disclosure describes herein as GeoBMS, which has been designed as a global cloud-based controller that architecturally sits between existing Brownfield BMS implementations item 5 and third-party building management applications item 9.

The third layer of the hybrid model comprises the Building Management Applications layer item 9. Through the use of client APIs item 6 and item 7, GeoBMS accelerates the development of third-party applications to improve building performance and occupant experiences. Applications/services in this layer may include disaster evacuation services and lighting control management as illustrated in FIG. 2.

The interconnections between the three layers of the Hybrid Model in FIG. 2 are now discussed. GeoBMS offers published "Northbound" client APIs item 8. Application developers can use these APIs to abstract underlying infrastructure capabilities (by GeoBMSs translation into higher order language commands as described further below) of Brownfield Implementations item 5. GeoBMS item 7 enables the management of custom, vendor-specific interfaces with the underlying BMS implementations item 5 in order to fetch building performance data and update relevant building subsystems and devices (which GeoBMS Item 5 enables through command decomposition as further describe below. "Southbound" integration APIs item 6 connect GeoBMS item 7 to diverse, onsite BMS deployments item 6.

Components of GeoBMS—The Middle Layer of the Hybrid Model

Figure 3:
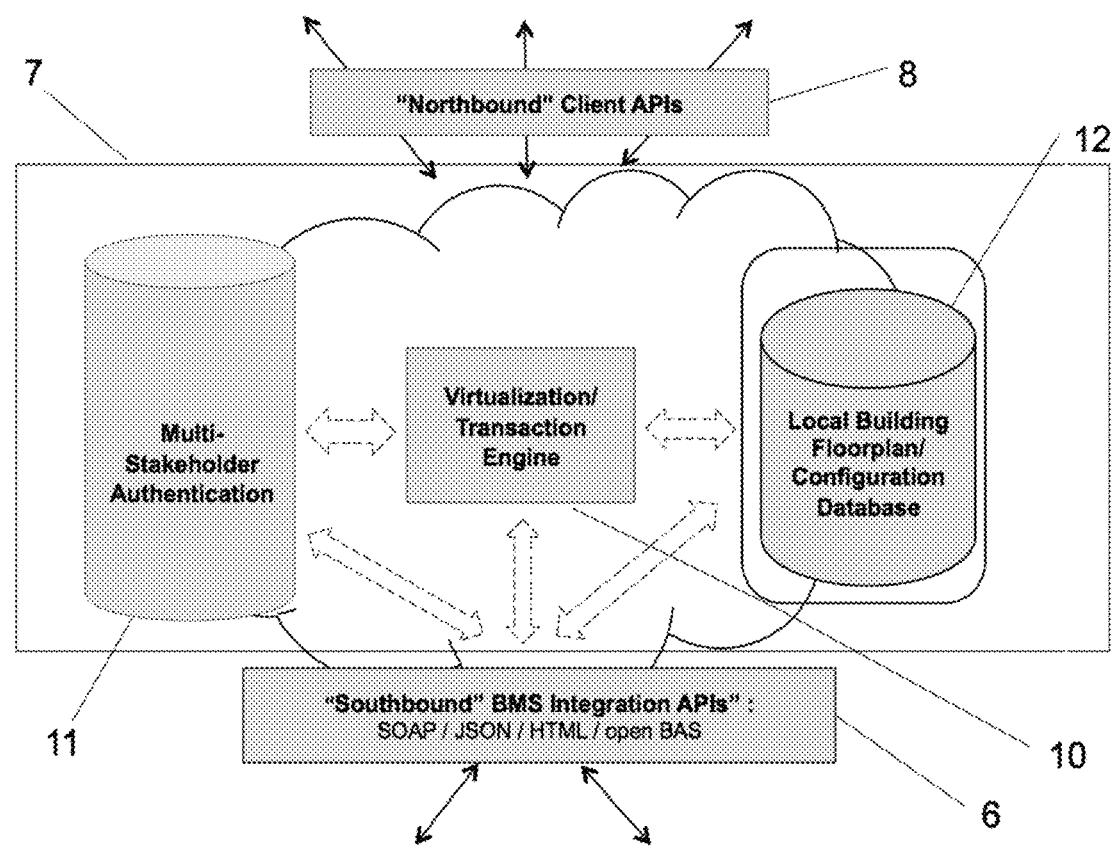
FIG. 3 provides an illustration of the GeoBMS architectural components according to one embodiment of the present invention.

According to one embodiment, GeoBMS Item 7 has five main components as shown in FIG. 3. One such component is a published "Northbound" client APIs item 8. Application developers may use Northbound client APIs item 8 to abstract underlying infrastructure capabilities. GeoBMS item 5 thereby enables managing the custom, vendor-specific interfaces with the underlying BMS implementations (brownfield implementations item 5) in order to fetch building performance data and update relevant building subsystems and devices. The fetching and updating (commitments) in turn enable application developers to construct applications related to energy management, evacuation services, lighting control management item 9 and other such value-added service applications (EnergyOptimizer is an illustrative application described in more detail below).

Another component illustrated in FIG. 3 is "Southbound" integration APIs item 6 that connect GeoBMS item 7 with diverse, onsite BMS deployments (Brownfield implementations item 5) in an individual building or a campus of buildings. This integration establishes the infrastructure for GeoBMS Item 7 to ingest data, which GeoBMS Item 7 may in turn persist, manage and/or relay via the Northbound APIs item 8 to application developers for third party application development item 9. It will be noted that, while in FIG. 2 Southbound API item 6 is presented as separate from GeoBMS item 7, in some embodiments, such as shown in FIG. 3, Southbound API item 6 may be considered part of the GeoBMS Item 7. Indeed, to connect with on-premise BMS item 5, two components are needed: a first component entailing an API set library provided by the BMS vendor for a specific version and a second component as drivers within GeoBMS Item 7 to integrate with specific API libraries.

As further shown by the embodiment of FIG. 3, in addition to the Northbound item 6 and Southbound APIs item 8, GeoBMS Item 7 contains a core processing engine item 10 for virtualization and transaction support, an authentication server item 11 for multi-stakeholder management of access privileges, and a local database item 12 to efficiently process static building information such as floorplan and configurations.

As one of ordinary skill in the art will recognize, the use of APIs discussed herein presumes standard networking connections, including transport and session protocol adherence, in order to remotely access GeoBMS instances from application servers.

GeoBMS architectural components collectively address the limitations of BMS implementations as shown in Table 1 below, which maps three limitations associated with traditional BMS limitations with GeoBMS item 7 components that are responsible to deliver these architectural characteristics.

TABLE 1

Mapping Current BMS Limitations to Resolving GeoBMS Architectural Characteristics

| Current BMS Limitations | GeoBMS Architectural Characteristics (Components) |
| --- | --- |
| Limited accessibility to on-premise BMS implementations | Virtualization<br>"Northbound" client APIs<br>Virtualization engine<br>"Southbound" BMS integration APIs |
| Lack of data consistency (scalable analytics) | Unified Cloud Data Storage<br>Cloud database that stores static floorplan and configuration data<br>Unified schematic data representation (including common building data models)<br>Access to "best in class" cloud analytics/AIML solutions |
| Limited stakeholder support | Multi-Stakeholder Authentication<br>Management of access privileges<br>Concurrency management<br>Conflict resolution |

We now describe in more detail the virtualization engine item 10, multi-stakeholder authentication item 11, and the local building floorplan/configuration database item 12. The virtualization engine item 10 is part of the system chain that enables upstream energy management services to seamlessly connect with different downstream sensors and building management systems. Virtualization abstracts proprietary vendor interfaces into a single interface for users to access via the Northbound APIs item 8.

GeoBMS item 7 allows developers to rapidly develop and provision building management applications without worrying about the underlying BMS implementation details item 5. As described further in the following sections, GeoBMS item 7 offers published get( ) and set( ) operators that applications can use. It will be appreciated by those skilled in the art that a number of APIs can be introduced for achieving the benefits described herein, such as those published for Energy Management applications found in [8]. Using the virtualization transaction engine item 8, get( ) and set( ) operations can be converted into onsite specific BMS operations for execution.

GeoBMS Item 7 maintains a cloud database to store static and semi-static building information such as floorplans and active configuration settings in the Local Building Floorplan/Configuration Database item 12. This local storing (caching) of information has several benefits (local in this context means local to GeoBMS Item 7 but remote from on-premise BMS item 5). First, information retrieval is much more efficient than fetching information from underlying BMS implementations item 5. Second, the longitudinal information stored in the local database can be used for historical trend analysis. Third, being cloud-based, the database can utilize "best in class" AI and machine learning tools in order to predict and optimize building performance. Embodiments may make use of emerging BIMS data models to conform to industry-standard building representations [5].

GeoBMS's multi-stakeholder authentication engine item 11 enables management of user registration and access privileges. Multi-stakeholder authentication allows the personalization of services for diverse stakeholders (from building owners, operators/managers, enterprise tenants, and individual occupants). For example, GeoBMS may check if a given user has privileges to change the temperature settings of an office space (i.e., s/he is the registered occupant of that office space). GeoBMS's transaction management engine item 10 supports concurrency control and conflict resolution among multiple users. For example, if the requested temperature setting is outside the policies set by the facility operator, the temperature setting may either be rejected (or in some special cases accepted but with warning notifications), depending upon the user's access privileges.

Alternative Embodiment of GeoBMS Hybrid Model

Figure 4:
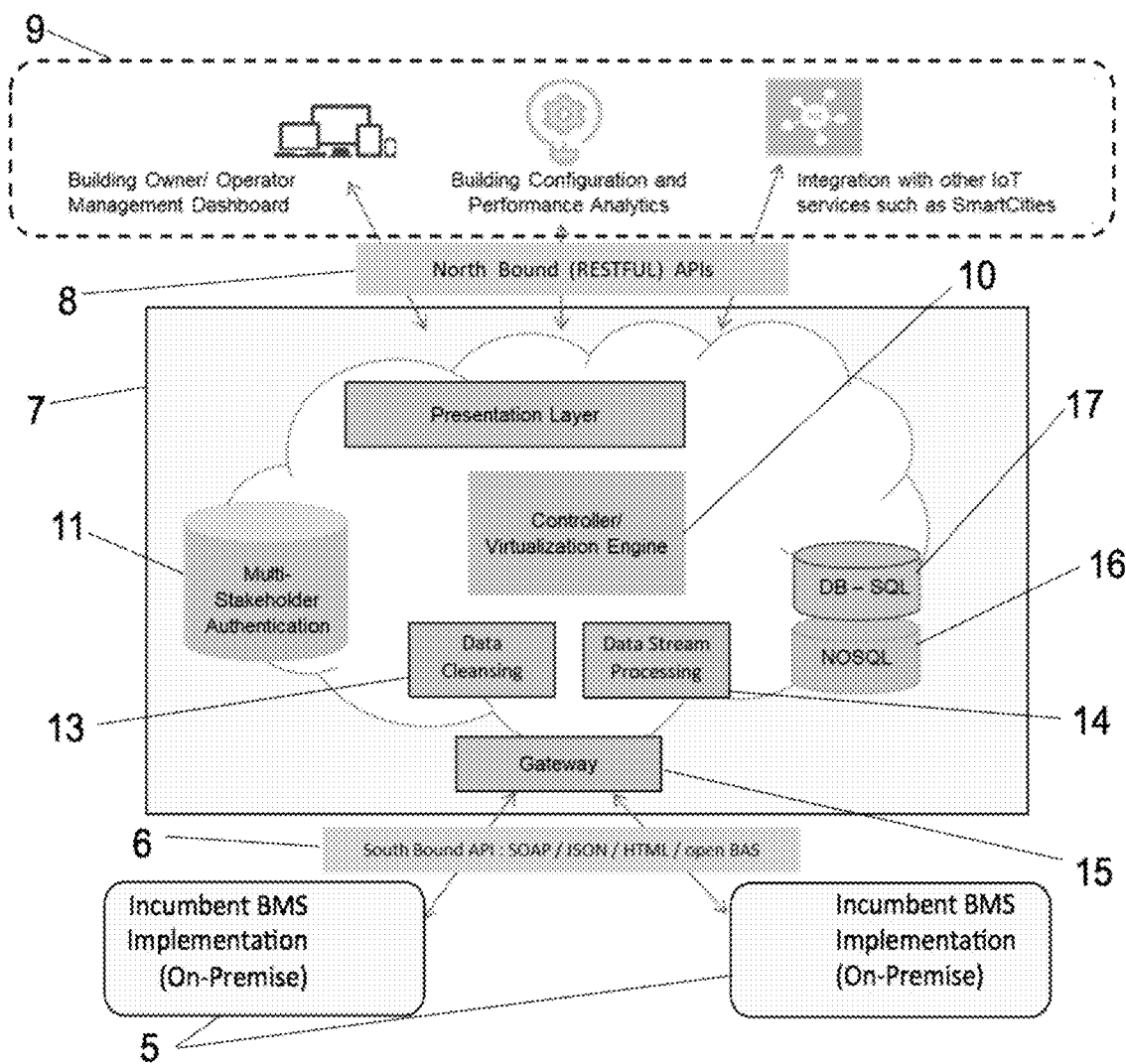
FIG. 4 presents GeoBMS with a hybrid model.

An alternative embodiment of components provided by GeoBMS, as presented within the context of the Hybrid Model, may be seen in FIG. 4. The illustration of FIG. 4 places an emphasis on architecture for data flows with design consideration built on five architectural considerations that help address the data management and stakeholder complexity challenges posed by large commercial buildings and/or geographically dispersed campuses. Specifically, these five considerations are:

A. Cleansing of error-prone input data streams with data cleansing component item 13

B. Processing, in real-time, very large data streams with data processing component item 14

C. Managing authentication and data access privileges of a dynamic set with multi-stakeholder authentication engine item 11

D. Storing a diverse set of structured design and partially structured operational data attributes with SQL and NO SQL databases item 16 and item 17

E. Using a Global-BMS controller to virtualize incumbent BMSs with virtualization engine item 10

In the embodiment described in FIG. 4, GeoBMS incorporates gateway item 15 to translate the legacy protocols of incumbent BMS language into Spark messaging, as an example of a multi-database cloud framework for messaging and analytics (details on incorporation of Spark are provided further below).

The act of data ingestion includes activities from both data cleansing 13 ABC and data stream processing item 14. Constraint-based filtering may be applied to flag data errors (such as range checking, false negatives/positives, or null values). Open source Spark environment performs event processing and multi-node computations using RDDs for the large time-data streams. Spark is a central capability to address the ability of Individual BMSs to transmit high periodicity, large volume data streams. The size, periodicity, and diversity of data streams obviously increase with expansion to large campuses and geographically dispersed real-estate portfolios.

Building information, such as static floor plans and semi-static temperature settings (as described above) includes both structured and unstructured data attributes. GeoBMS uses SQL item 17 and NoSQL databases item 16 for storing and managing less structured operational data.

As described above, GeoBMS offers "north bound" APIs for third-party service development, with the same item 8 in FIG. 4 as in previous FIG.s, for delivery and monetization. Building applications include but are not limited to: (i) simple usage analytics of campus/building energy consumption for building owners/operators, and (ii) emergency evacuation planning (e.g., lighting of appropriate evacuation paths for different planned emergency scenarios such as fire, earthquakes, tornadoes, or firearm incidents).

Figure 5:
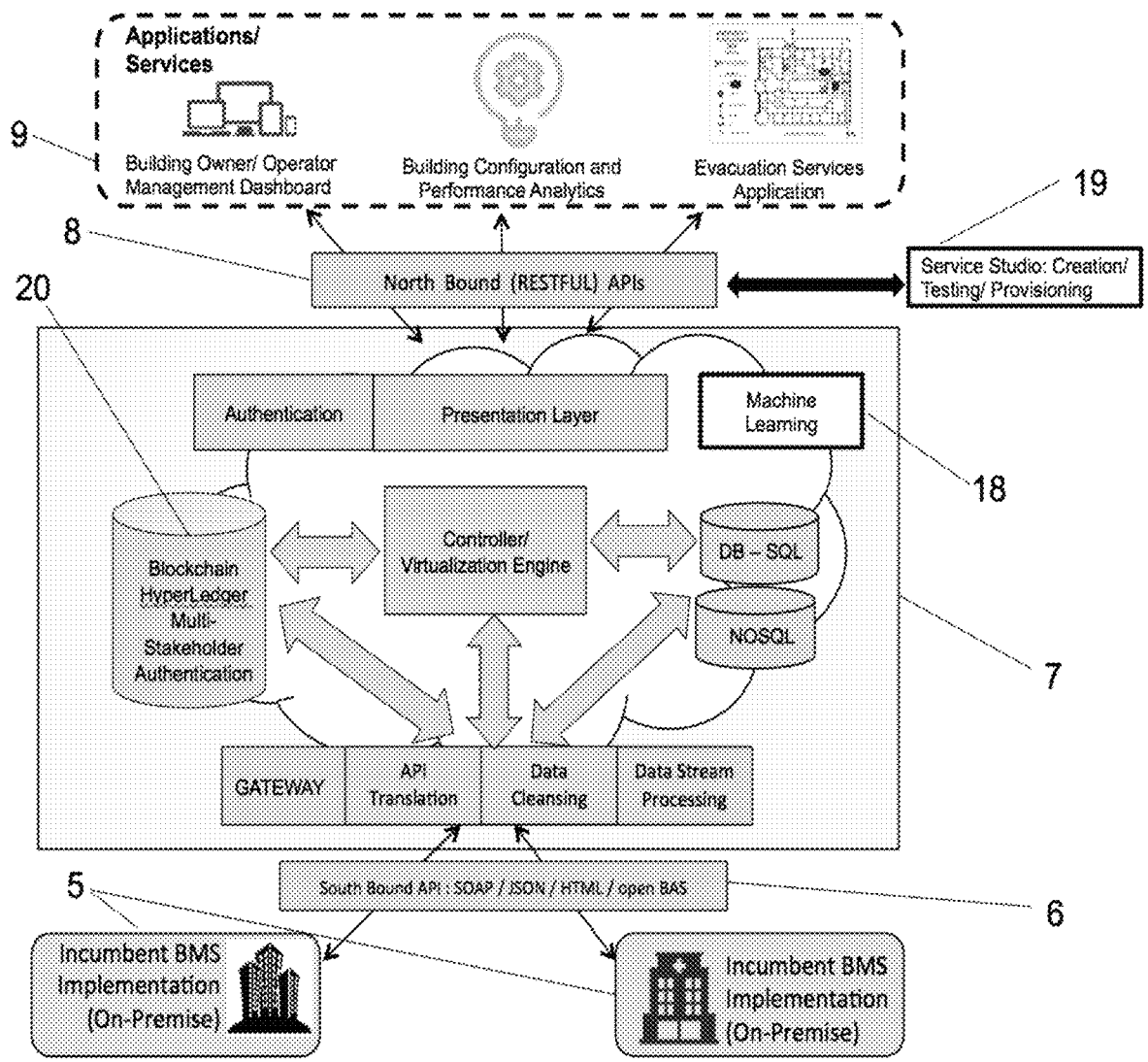
FIG. 5 presents an additional embodiment of the hybrid model with an additional GeoBMS and hybrid model components.

In yet another embodiment, as shown in FIG. 5, GeoBMS can incorporate machine learning applications, shown as item 18 in FIG. 5, such as regression models and neural networks, to run atop data set sets contained within the SQL and NOSQL databases. The machine learning allows pattern recognition and predictive analytics built into the GeoBMS that can be leveraged to support application development via the Northbound APIs (ITEM ABC). Also shown in the embodiment presented in FIG. 5 as item 19 is the service studio development/testing/provisioning application, which allows for the creation, test, and provisioning of new services to be deployed via GeoBM to the Southbound API.

As described, commercial buildings have a diverse set of stakeholders, including building owners, property managers, and corporate/small business tenants and occupants. Each of the stakeholders comes with their own requirements and periodicity of usage. Building owners may remain in that role for extended periods of time (decades or even generations). Property managers, on the other hand, may switch every few years. Tenants have varying durations, but most may remain for a period of between 2 and 5 years. Occupants are dynamic. Some, like occupants of office spaces, may remain until they retain a given role within the tenant company (e.g., between 1 and 2 years). Occupants of flexible workspaces may have their location for a day, while occupants of a conference room may change within the hour.

In some embodiments, as illustrated in FIG. 5, GeoBMS employs Blockchain Identity Management item 20 to empower stakeholders to directly manage their profiles in a secure manner, obviating the need to retain dedicated resources for creating, deleting, or modifying user profiles (CRUD operations) or provisioning occupant experiences in real-time (e.g., setting room temperatures or lighting levels on usage).

Figure 6:
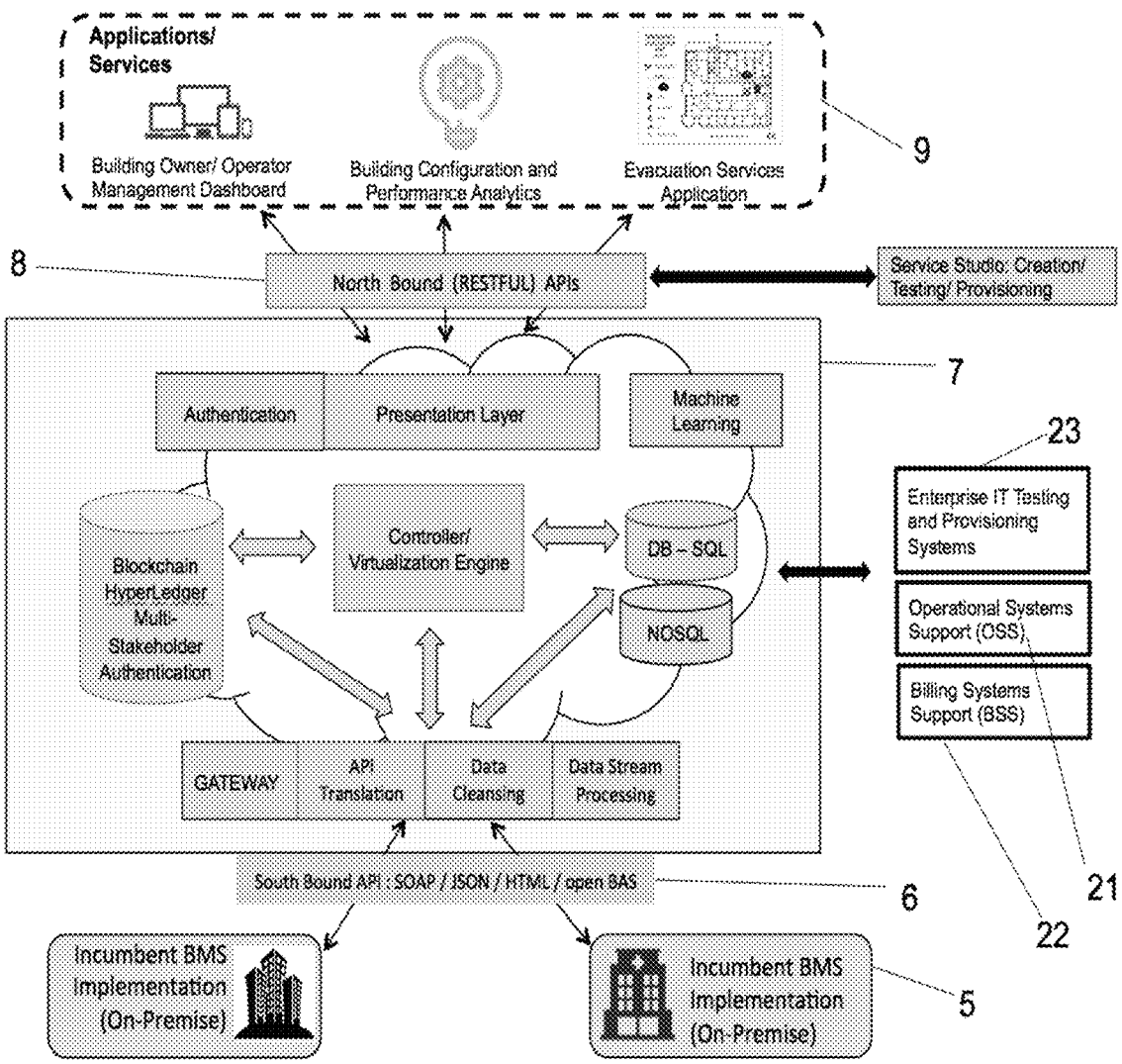
FIG. 6 presents yet another embodiment of the hybrid model with GeoBMS integrating with third-party testing and support systems.

An additional aspect as shown in FIG. 6 is that the hybrid model may be combined with and integrated together with third-party/enterprise systems for operational item 21 and billing systems support item 22. The third party systems may be fed information by GeoBMS, so that for example operational systems support item 21 may facilitate interactions with any facilities/IT help desk and trouble ticketing systems. In a complementary but independent aspect, Billing Support Systems (BSS), item 22 in FIG. 5, may be highly relevant for facility owners/managers who are looking to monetize energy savings and occupant personalization services. Further, integration with Enterprise Testing and Provisioning systems Item 23 may help ensure that Building Applications follow launch and testing protocols similar to other existing IT applications, further helping enterprise-wide adoption.

As will be appreciated, there are numerous benefits to virtualizing on-premise BMS Item 5 via the hybrid model as described in the various embodiments disclosed herein. For instance, building owners and operators of the building for which an on-premise management system is virtualized will realize financial rewards, while users or occupants of the building will have improved experiences.

Financial gains by virtualizing the on-premise system in the manner disclosed herein will result from improved energy efficiency gains by adapting to the system such that the system expends energy, uses lighting systems, or operates other appliances only when and as needed, while conventional BMS will be "stuck" in the original configurations that subsequently become misaligned and increasingly inefficient over time. Continuous alignment avoids configurations from going awry when a new device is installed, a new software operating system is introduced, building layout changes occur, or physical occupancy patterns evolve.

Indeed, GeoBMS item 7 allows remote and ongoing active monitoring and optimization. By using the hybrid model to virtualize on-premise building systems item 5, these systems have more ready access to emerging tools, such as newly developed analytics and machine learning item 18. Such tools provide added efficiency gains that accumulate atop any other savings that result from avoiding poor alignment. Moreover, as described above, the present disclosure contemplates the inclusion and consideration of Billing Support Systems (BSS) item 20 and other financial management systems that traditionally had to be integrated (if even used at all) on a one-off basis with on-premise building management systems. A plug-and-play billing system bypasses the unwieldy set-up and installation otherwise required with traditional building management systems. The same applies for enabling seamless integration with Operating Support Systems (OSS) item 21 to leverage existing contacts and technical support capabilities—an otherwise tedious and challenging process with traditional building management systems.

In addition to the aforementioned benefits, third-party application development via the Northbound APIs item 8 establishes a wealth of new services and provides a bridge to an ecosystem of technical development historically unable to provide software products for building management systems that were more siloed and constrained to proprietary commands and interfaces. The highly scalable platform enabled by GeoBMS item 7 may, in some sense, be considered akin to the formation of a new environment for developers to create value without having to be concerned with a multitude of different BMS languages and protocols that would otherwise vary by BMS vendor and version. EnergyOptimizer, as an illustrative application development below, provides a small window into the opportunities and value-add that may be generated through third-party application development building atop and within the hybrid model system.

By establishing a higher order data operator and manipulator language, GeoBMS item 7 can translate the various inputs received from multiple Southbound APIs item 6 that may be in widely divergent formats and bear no coherence from one BMS API to another. The higher order language smooths out and reconciles input such that developers can receive information via the Northbound APIs item 8 and work efficiently and effectively to create applications that will permeate across various BMS versions and sites. Further, BMS in reverse receives the output of these applications, which are agnostic to the particulars of any particular onsite BMS, and decomposes the agnostic commands into a language that can be fed to and received by the various and divergent onsite building management systems via the one or more Southbound APIs item 6, as further illustrated below.

The new service creation and deployment by the scalable platform may extend into many different areas to enhance stakeholder and occupant experiences, thereby creating new revenue streams and increasing tenant/occupant loyalty. Commercial building owners and operators are now given the latitude to create "sticky" occupant and tenant services that will reduce churn and create new revenue streams. The wealth and proliferation of these streams are in part foreseen and in part unforeseen (and unforeseeable), as the platform described herein will support new services limited only to the imagination of the application developers and stakeholders leveraging the platform capabilities.

The teachings herein consider and build upon recent developments of new cloud solutions to deliver superior occupant experiences for the commercial building management industry. Some instances of changes seen by cloud systems can be seen in areas of residential management systems with emerging product developments by Google, with its Nest home thermostat and security system. GeoBMS's service virtualization and personalization platform offers a pathway for building owners and incumbent BMS providers to embrace these user experience-driven industry disruptions and start to deliver truly transformative occupant experiences.

API and Local Databases Definitions and Manipulation Operators

The systems and methods disclosed herein and employed by and with GeoBMS Item 7 support the following Data Definition and Data Manipulation operators. This application contemplates leveraging classification of operators that follow industry classifications adopted by other declarative languages such as SQL (which logically has data definition language (DDL) and data manipulation language (DML) operators) and should be recognized by those having ordinary skill in the art.

GeoBMS Item 7 supports at least the following Data Manipulation operators:

TABLE 2

| GeoBMS Data Manipulation Language Operators | | |
|---|---|---|
| Data Manipulation Operator Class | Description | Execution Flows |
| 1. Updates to building occupant experiences. | Includes changes to occupant settings (such as temperature or lighting settings) as well as changes to other known attributes (such as energy budgets or hours of operation). | GeoBMS receives these changes from occupants or building operators (or other building applications such as automated machine instructions). GeoBMS translates said changes into BMS vendor-specific operators for execution. Confirmation of the completion of the transaction is then passed on back to the user or application that originally requested/provided the changes. In addition, if some of these data attributes are locally stored, they may be updated in the SQL/NOSQL databases of GeoBMS as well. |
| 2. Insertion or deletion of new hardware devices to the onsite BMS. | Includes the addition or removal of hardware devices (such as sensors, controllers, air-handling units, compressors, chillers etc.). This could also include upgrades to these devices. Such upgrades would be considered as a removal of older equipment followed by addition of newer replacements. | Adding or removing new devices may be considered by the system as an action to add or delete rows/objects to SQL/NOSQL databases. Addition or deletion of new devices may also require appropriate configuration changes that are transmitted to onsite BMS software. Recognizing the potential importance for accurately managing a current configuration of building hardware and software, the disclosure herein also contemplates user notifications for any object additions and user confirmations before any deletions. |
| 3. Addition or removal of users (e.g., stakeholders) | Adding or removing new users or stakeholders such as new users, tenants, and building operators, who have input into the management of the building systems (including but not limited to | Adding or removing new users may be considered by the system as an action to add or delete user information to SQL/NOSQL databases as well as any light-weight authentication |

TABLE 2-continued

GeoBMS Data Manipulation Language Operators

| Data Manipulation Operator Class | Description | Execution Flows |
|---|---|---|
| | temperature settings, light operations, etc.). | data repositories. Some embodiments of the system require changes to the Blockchain Hyper-Fabric based identity management as well as changes to the BMS and GeoBMS databases. Please note that as the execution of many of the query operators can be made dependent on the data access privileges of the individual's profile, the system includes write functions to append queries with the profile information and access privileges |

GeoBMS Item 7 also supports at least two additional Data Definition Operators shown in Table 3.

TABLE 3

GeoBMS Data Definition Language Operators

| Data Definition Class | Description | Execution Flows |
|---|---|---|
| 1. Initialization (or removal) of a new building. | Adding a new building or removing an existing building will invoke operators to either (i) create the schema of the building and populate with ingested static design and dynamic operational data, or (ii) remove all data related to the building and finally remove the schema as well. | Addition of new building: The set of Data Definition operators creates new tables and objects in order to capture the static design and dynamic operational data for a building. Removal of new building: The set of Data Manipulation operators to remove all data related to the building and subset of Data Definition operators to delete schemas and tables unique to the building being removed. |
| 2. Interoperation with new BMS vendor/version. | Adding a new BMS integration such as expanding to a new BMS vendor or a new version of an existing BMS | Install new API library to interact with BMS vendor/version. Execute language translation dictionary to translate GeoBMS operations into BMS vendor provided API. |

Using the above operators, GeoBMS item 7 can provision, virtualize, and optimize new buildings. There are two basic scenarios for the execution of any user or application initiated "Northbound API" item 8.
  Scenario 1: The API request and associated queries (and updates) may be fully resolved by the data stored in the SQL NOSQL databases items 16-17 in GeoBMS item 7. Examples of such queries include energy consumption analyses or trends, the data required for these analyses being fully stored within local cloud data models within the GeoBMS platform.
  Scenario 2: The API request and associated queries (and updates) may require real-time inquiry into the virtualized BMS (and possibly further inquiry from the BMS to the underlying sensor or controller). In this scenario, as explained earlier, GeoBMS item 7 will translate the user initiated Northbound API request into BMS vendor-specific operators that can be then executed by the on-premise BMS. In addition to transmitting the requests to the underlying BMS implementations for execution, the Southbound APIs item 6 are also used to receive the results of the BMS execution. GeoBMS Item 7 then reverse translate the BMS response into the general-purpose user query language and results.

In the course of establishing GeoBMS Item 7 with a new facility and onsite BMS item 5, the following steps may be employed. The description below also explains the process for executing and optimizing GeoBMS item 7 after the system has been provisioned.
  Provisioning a New Building:
  Step 1. GeoBMS item 7 determines if one more API operators (i.e., a library of APIs) item 6 already exist for the BMS software item 5 that is presently implemented on the site of consideration (e.g., GeoBMS item 7 has already pre-installed the library of APIs to integrate with a specific version of Metasys, as an example of a commercially existing BMS). Step 1a) below would execute if such a library is preinstalled in GeoBMS, while step 1b) would execute if the API library does not already exist.

a) If the API library item 6 exists for the BMS vendor and version item 5 exists, skip step 1b and proceed to step 2.

b) Else if the API library item 6 does not exist, GeoBMS Item 7 installs a new API library to integrate and operate with the specific BMS item 5 (uses Data Definition Operator #2 from Table 3).

Step 2. GeoBMS item 7 initializes the new building (uses Data Definition Operator #1 from Table 3).

Step 3. GeoBMS Item 7 then inserts or automatically loads all the devices for the new building (uses Data Manipulation Operator #4 from Table 2).

Virtualizing a BMS Instance:

Step 1. GeoBMS item 7 determines the API library item 6 for the BMS/vendor version item 5. All translations from the GeoBMS operators to BMS vendor/version specific operations will be done using this API library (conversions to and from higher order language to the specific language of the onsite BMS).

Step 2. GeoBMS item 7 performs the various querying operations, updating CRUD operators (uses Data Manipulation Operators #1, #2 and #3 from Table 2); CRUD operators are Create, Read, Update, and Delete.

Step 3. GeoBMS item 7 could also add or remove new devices (uses Data Manipulation Operator #4 from Table 2).

Step 4. GeoBMS item 7 can also add or remove users/stakeholders and/or modify their access privileges (uses Data Manipulation Operator #5 from Table 2).

Optimizing a BMS Configuration:

Step 1. GeoBMS item 7 performs trend analyses using the various querying operations (uses Data Manipulation Operators #1 and #2 from Table 2).

Step 2. Based on the analyses, GeoBMS item 7 could modify various setpoints in a configuration (uses Data Manipulation Operator #3 from Table 2).

Tools and Processes for Data Flows and BMS Virtualization

The cloud-based, global BMS controllers, item 7, that virtualize multi-vendor, traditional, on-premise BMS implementations item 5 described in this application establish novel approaches by leveraging many state-of-the art tools. One of ordinary skill in the art will recognize and appreciate the tools described below used in the right column of Table 4 to support the data flows employed by GeoBMS item 7.

TABLE 4

Illustrative Tools Employed to Execute GeoBMS Data Flows

| Architectural Considerations | Illustrative Tools |
| --- | --- |
| A. Cleansing error-prone data streams | Databricks Delta |
| B. Processing, in real-time, very large data streams | Apache Spark |
| C. Managing authentication and data access privileges of a dynamic set of stakeholders | Blockchain Identity Management |
| D. Storing a diverse set of structured design and partially structured operational data attributes | Building Information Models (BIM) |
| E. Virtualizing management controls over incumbent BMSs | Software Defined Networks (SDNs) |

The tools mentioned above are leveraged by the system described herein and are either reapplied to the building management domain (e.g., applying Databricks Delta to ingest building management data), though this application also contemplates fundamentally extending said tools (e.g., extending BIMS to include operational data), or some combination thereof (e.g., a blockchain hyperledger framework for managing stakeholder authentication and access privileges). A summary of reapplications and extensions of useful tools and technologies:

Databricks Delta and Apache Spark may be applied in the new domain of building management BIMS may be extended to include operational data BIMS may be implemented in a combination of both structured SQL and semi-structured NOSQL databases Blockchain's hyperledger framework may be applied in the new environment of building stakeholder authentication and access privileges SDN models may be applied with their framework for integrating with the BMSs using GeoBMS APIs One of ordinary skill in the art will recognize that while the foregoing examples are provided as available technologies for managing the data flows, these tools are illustrative, and neither exhaustive nor necessary. In many embodiments, data management and manipulation may occur without the use of any of the aforementioned tools.

Illustrative Third-Party Application Built Atop of GeoBMS: EnergyOptimizer

As describe above, GeoBMS item 7 described herein presents a platform for establishing new application development by third parties who may leverage the higher-order demand operators and manipulators via the Northbound APIs. The present disclosure provides an exemplary application, as shown in FIG. 7, called EnergyOptimizer item 9a, built using GeoBMS item 7 middle layer in the application development layer item 9).

The aforementioned benefits of energy efficiency gains can be seen with the EnergyOptimizer item 9a application, as the application is designed to optimize energy consumption in a particular building as shown with a museum use-case scenario. The system can be developed on conventional and well-known software languages and software kits, such as Eclipse using Java SE Development Kit 8, Update 131 (whereby a third-party developer need not concern herself/himself with the underlying on-premise BMS implementation language and data manipulators/operators, given the higher-order translations performed by GeoBMS).

Figure 7:
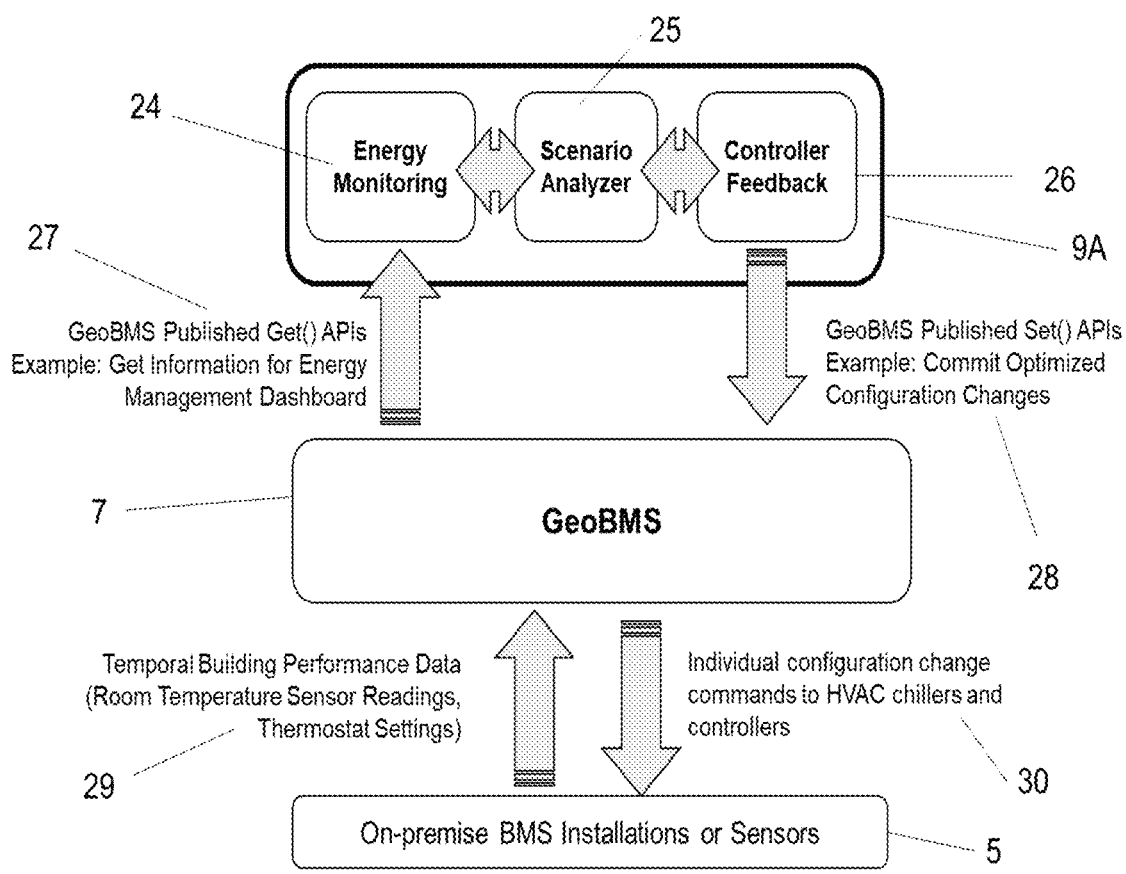
FIG. 7 presents an energy optimization application sitting atop GeoBMS with associated API command and data flows.

The schematic of EnergyOptimizer item 9a shown in FIG. 7 is an embodiment with three software components:

a. Energy Monitoring component (item 24) that tracks energy performance and compares current room temperatures against prespecified set points. Further below is a description of a sample user interface of an energy monitoring module.

b. Scenario Analyzer component (item 25) explores different energy consumption and management scenarios to help building owners/operators comprehend tradeoffs between occupant experiences and energy costs. Described below is a sample user interface of a scenario analyzer module outcome later in this section.

c. Controller Feedback component (item 26) commits analyzed and optimized configurations back to the underlying BMSs via the GeoBMS middle layer, which in turn decomposes the commands to the specific vendor and version employed by the onsite BMS system. A sample execution is provided later in this section.

As described above, GeoBMS Item 7 offers published APIs (i.e., "Northbound" APIs item 8) for applications such as EnergyOptimizer item 9a to access virtualized infrastructure capabilities. Get( ) APIs item 27, allow applications such as EnergyOptimizer application to get information from underlying BMS installations or directly from sensors. With the EnergyOptimizer application, the retrieved information may be viewed with an Energy Management Dashboard as further described below.

Another API is Set( ) Item 28, which allows applications such as EnergyOptimizer item 9a to set information item 28 back to the underlying BMS implementations item 5 or perhaps directly to sensors. In the case of EnergyOptimizer item 9a, an example of this can be committing optimized configuration changes item 28 back to the BMS implementations item 5 or sensors via GeoBMS item 7.

In order to support a Get( ) API item 27, GeoBMS item 7 may in turn request to get information from the underlying BMSs item 5 using vendor provided APIs item 6. In the case example presented herein, when Energy Monitoring item 9a module requests GeoBMS Item 7 for information for energy management dashboards, GeoBMS Item 7 in turn may request the underlying BMS installations item 5 for temporal building data item 29 such as room temperatures, sensor data, and thermostat settings.

Similarly, in order to support a Set( ) API item 28, GeoBMS item 7 may in turn commit one or more configuration changes back into the commands to underlying BMS implementations item 5 and perhaps to sensors and controllers. In the provided case example, when Controller Feedback module item 26 may commit optimized configuration changes item 28, GeoBMS item 7 in turn may commit changes to the affected devices item 30 such as HVAC chillers and controllers.

Before describing EnergyOptimizer application item 9A with a use-case example, we provide a brief description of temperature settings that are currently considered for energy management applications.

As example of temperature settings that GeoBMS Item 7 support, this disclosure discusses three types of temperature settings. These temperature setting definitions form background material for the case example of a museum floorplan to illustrate the execution of Set_temp( ), Set_temp_limits ( ), Get_temp( ) and Get_temp_limits( ) APIs.

a. A single temperature setpoint (or Fixed Setpoints): Single temperature setpoints specify specific temperature values for a room or space within a building. Single temperature setpoints are expensive to maintain and are thus reserved only for spaces that absolutely require strict temperature controls. Building performance succeeds when current room temperatures exactly match these fixed setpoints, and fails otherwise.

b. A fired temperature range (or Strict Temperature Ranges): Fixed temperature ranges specify a range of acceptable temperature values (as opposed to a single fixed setpoint). Strict temperature ranges are less restrictive than fixed setpoints and are appropriate for spaces that can tolerate a wider range of temperatures. Building performance succeeds when room temperatures are within the fired temperature range, and fails when room temperatures are outside the range are not.

c. A suggested temperature range: Suggested Temperature Ranges specify a range of preferred or suggested temperature values. Unlike strict temperature ranges, building performance does not explicitly fail if temperatures lie outside suggested ranges. Suggested temperature ranges are the least restrictive temperature settings, and are often used as the default settings for most building spaces such as, public foyers, dining rooms, and cafes. Suggested temperature ranges are designed to offer comfortable occupant experiences but on a best-effort basis. Building performance succeeds for all temperatures, though out of range room temperatures may be flagged by warning signs or colors.

Enemy Optimizer: Energy Monitoring Module.

Figure 8:
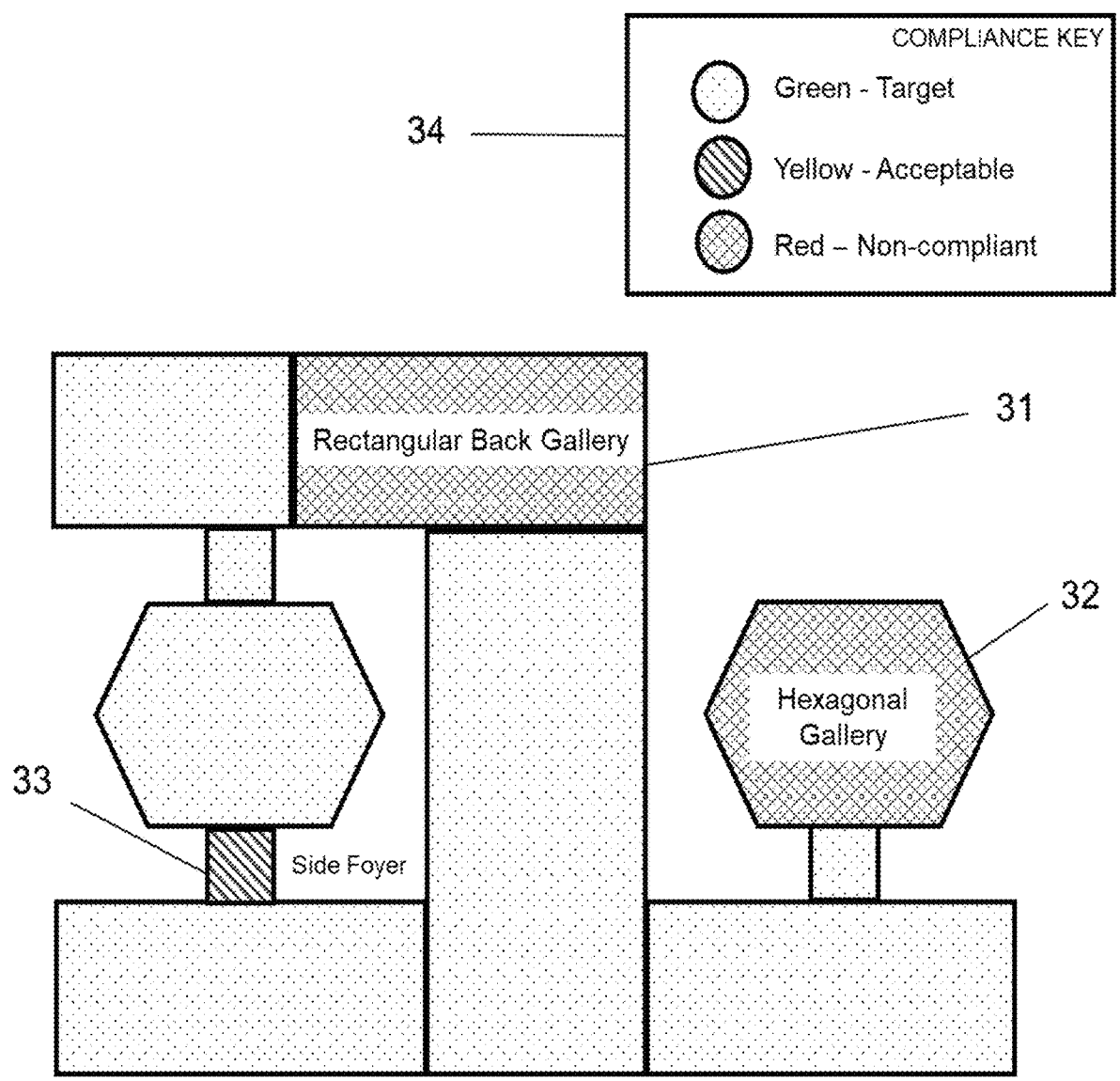
FIG. 8 shows a sample output of a museum floorplan using an Energy Monitoring Module.

FIG. 8 shows a graphical representation of the Energy Monitoring module. Current temperatures are compared with the temperature settings, and the results are overlaid on top of the floorplan. The Energy Monitoring application uses two APIs to do this comparison:

Get_temp( ) API to get the current temperatures of the different rooms and spaces on the floorplan.

Get_temp_limits( ) API to get the type of temperature setting and specific values required or suggested for each space.

By comparing actual versus specified values, the Energy Monitoring application is able to determine if the current temperatures for each given space are in compliance with the specified temperature settings.

The display in FIG. 8 shows the application of the Energy Monitoring module for a museum example floorplan. The museum floorplan has spaces corresponding to each of the three temperature settings that were presented earlier. The present temperature values are compared against the temperature settings for each type of floor space. The compliance key item 34 is provided for this graphical representation. The results of this compliance are shown in floor spaces items 31-33 of FIG. 8.

a. The temperature settings for the top art galleries are "fixed setpoints." This corresponds to the need for top galleries to enforce strict temperature controls in order to preserve expensive and often irreplaceable art exhibits. EnergyOptimizer's Energy Monitoring module reflects a GREEN boundary color when the room temperature exactly meets the single temperature setpoint and a RED fill pattern otherwise (see rectangular back gallery item 31).

b. The museum floor plan retains a fixed range of temperature setpoints for exhibits with less stringent climate control requirements (such as galleries with metallic sculptures or more robust artworks) and thus can be maintained with "strict temperature ranges". EnergyOptimizer's Energy Monitoring module reflects this constraint by assigning a GREEN boundary color for times when the room temperature is within the set range and a RED fill pattern otherwise (see hexagonal gallery item 32).

c. The museum floor plan defaults to "suggested temperature ranges" for the remaining public spaces (such as the museum entrance, foyers, corridors between galleries, and the café). Suggested temperature ranges are designed to offer comfortable occupant experiences, but are maintained only on a "best-effort" basis. EnergyOptimizer's Energy Monitoring module reflects this constraint by assigning a GREEN boundary color for when the room temperature is within the suggested temperature range and a YELLOW fill pattern otherwise (see rectangular side foyer item 33).

Figure 9:
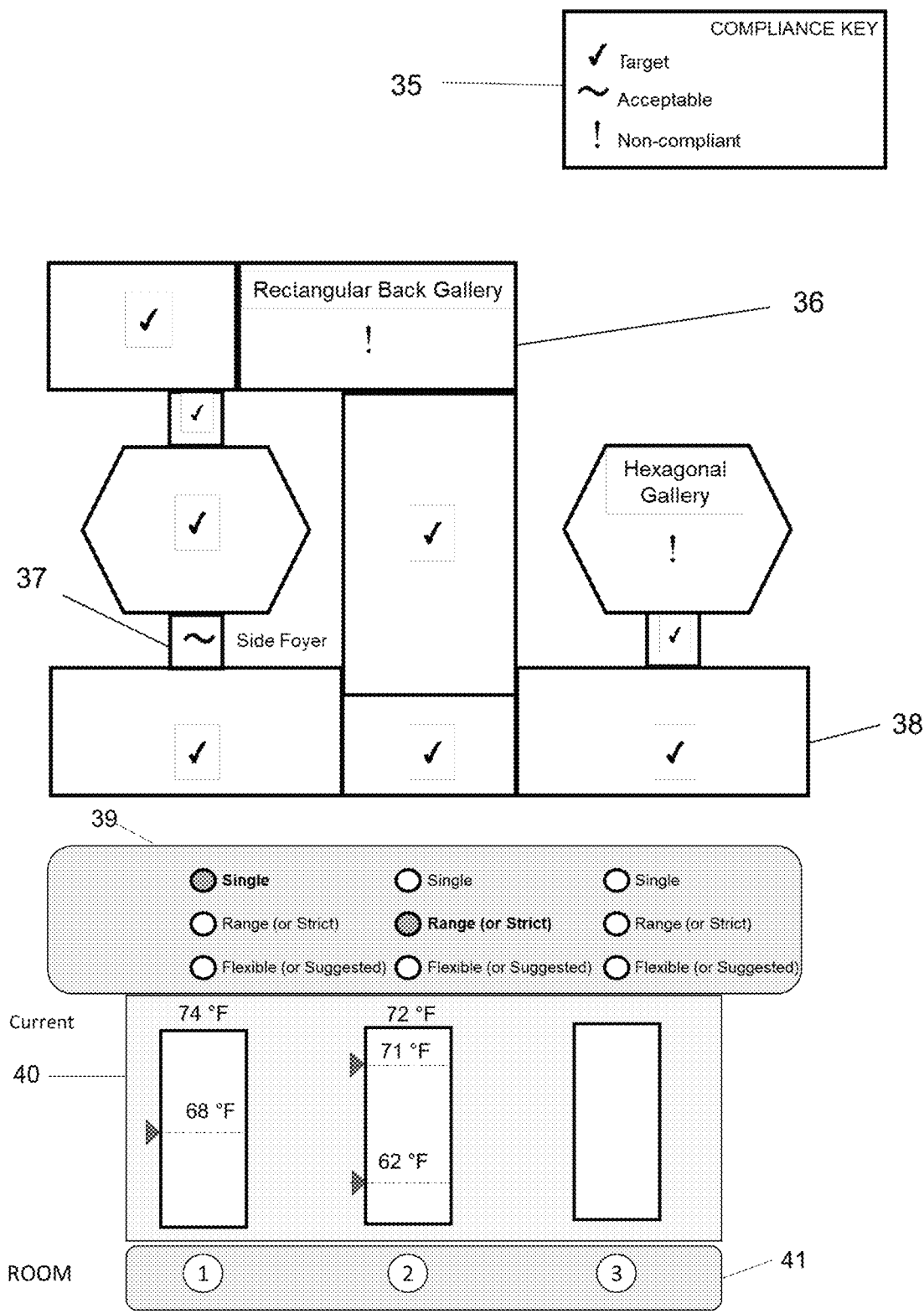
FIG. 9 shows an alternate representation of the output of the museum floorplan using the Energy Monitoring Module.

An alternate display for this use-case of Energy is shown in FIG. 9 with varied version of a compliance key item 35. All three types of outcomes are shown in FIG. 9:

non-compliant back gallery item 36 acceptable side foyer item 37 (as the temperature settings were a Suggested Temperature Range, failure to be in range does not result in non-compliance but is instead accepted)

compliant space item 38

Energy Optimizer: Scenario Analyzer.

The scenario analyzer empowers the museum operator to create and analyze different building configuration and temperature setting scenarios. FIG. 9 shows the graphical user interface of the Scenario Analyzer module. The Scenario Analyzer works with the following steps.

Step 1: The first step is to select a given room for which to analyze (item 41).

Step 2: For the room selected, select the temperature settings. Radio buttons item 39 allow the building operator to select the Temperature Settings.

Step 3. For each type of temperature setting selected, there is a slide bar that allows the building operator to set the temperature value (item 40).

Figure 10:
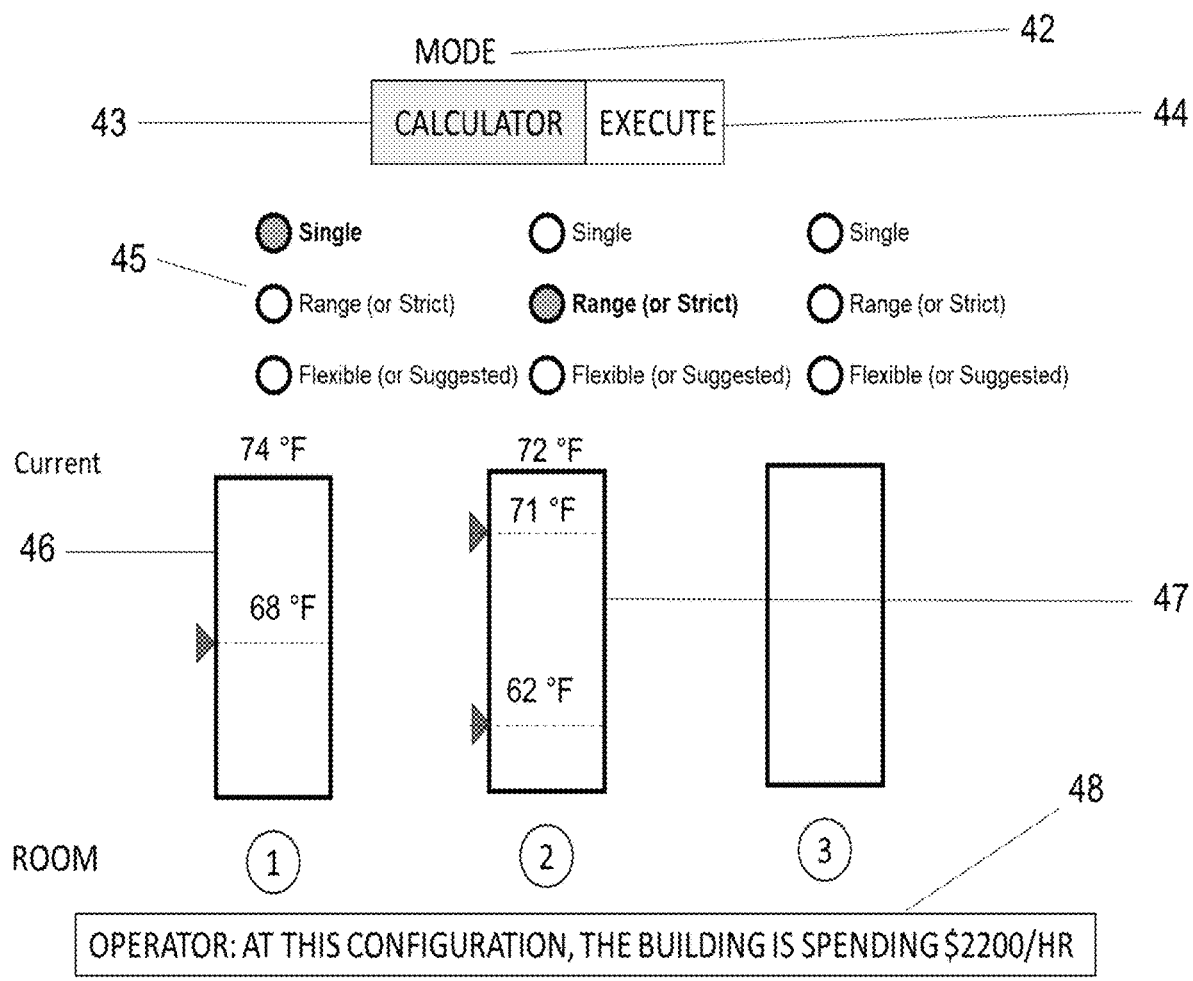
FIG. 10 shows a detailed user interface of Scenario Analyzer and Controller Feedback Modules with calculator and executor mode.

FIG. 10 shows a magnified view of the radio buttons (item 39 on FIG. 9; item 45 on FIG. 10) and the temperature sliding bars (item 40 on FIG. 9; items 46-47 on FIG. 10).
  a. Sliding bar for a Single Temperature Setpoint (or Fired Setpoints) temperature setting item 46. In this case, the sliding bar allows the building operator to select only one value, which is the Single or Fixed temperature setpoint.
  b. Sliding bar item 47 for either of the remaining two temperature settings: Fixed temperature Range (or Strict Temperature Ranges) or Suggested Temperature Ranges. In this case, the sliding bar requires the building operator to select two values, the high end and the low end of the temperature ranges.

The Scenario Analyzer has mode panel item 42 for toggling between the following modes:
  Calculator Mode item 43: Analyzes the settings and calculates the total energy costs for the temperature settings. The total energy costs item 48 are presented by the system.
  Execute Mode Item 44: Once the building operator has decided on configuration settings, Execute Mode item 44 commits the change back to GeoBMS Item 7. This is the user interface for the Controller Feedback item 26.

Alternative Embodiment of Scenario Analyzer

In addition, we also propose an alternate embodiment of the Scenario Analyzer. In this embodiment, the Scenario Analyzer can:
  Use preset scenarios, or
  Create a hybrid scenario based on the preset scenarios
We describe the execution of both these examples.

Use Preset Scenarios: For example, for the museum example, the Scenario Analyzer can have preset two extreme scenarios:
  a. Best experience scenario that attains the "ideal" temperatures for each of the three types of temperature settings. Such a "best experience" scenario would meet single temperature setpoints for top galleries and keep room temperatures at midpoints of both fixed and suggested temperature ranges. Financially, such a scenario would consume the most energy and be the most expensive. Full setting the system to best experience is shown by the comfort indicator item 50 in FIG. 11.
  b. Lowest cost scenario that meets only strictly enforced temperature settings. Such a "lowest cost" scenario would maintain room temperatures for top galleries at single temperature setpoints and keep other gallery room temperatures at the highest endpoint of fixed temperature ranges. Room temperatures at other public spaces would likely remain outside suggested temperature ranges so as to reduce energy costs. While cost optimal, this scenario offers sub-optimal experiences that may even make some of the museum's public spaces unusable on extremely hot or cold weather days. This scenario is also shown in savings indicator item 51 of FIG. 11.

Create a hybrid scenario based on the preset scenarios: Typical or realistic building configuration scenarios will likely lie somewhere in between the two extreme scenarios: "best experience" and "lowest cost".

Figure 11:
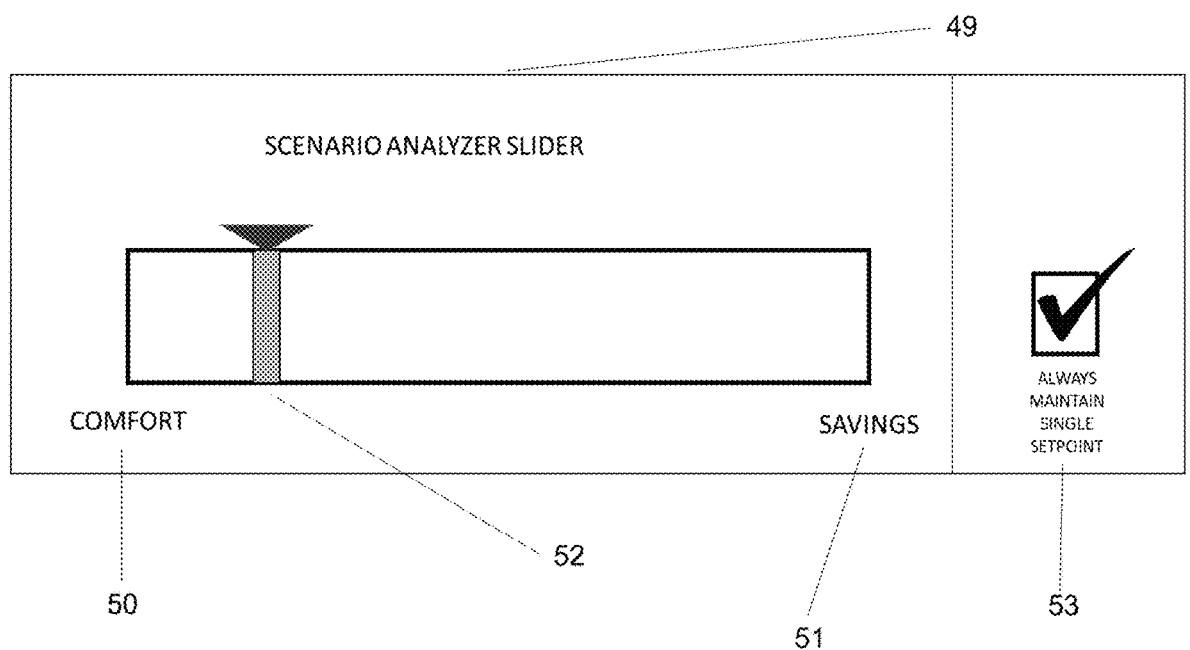
FIG. 11 shows a macro scenario analyzer that allows an operator to automatically set temperature configurations at the floorplan level of a floorplan.

FIG. 11 shows how the Scenario Analyzer module has a master slider item 49 to create a hybrid scenario from preset scenarios. The two preset scenarios are defined earlier as:
  1. Comfort Scenario or Best Experience Scenario item 50
  2. Savings Scenario or Lowest Cost Scenario Item 51

A slider bar item 52 allows the building operator to choose a hybrid option or realistic scenario between the two end case scenarios. Such realistic scenarios help the museum operator comprehend the impact of experience and cost tradeoffs and select a scenario that satisfies both [Simon1947]. The decided scenario then reflects the operator's final decision and may be one of the extreme or hybrid scenarios. The slider bar also includes a selection option item 53 to allow the building operator to retain a single setpoint option to be enforced in the automatic creation of the realistic or hybrid scenario.

Figure 12:
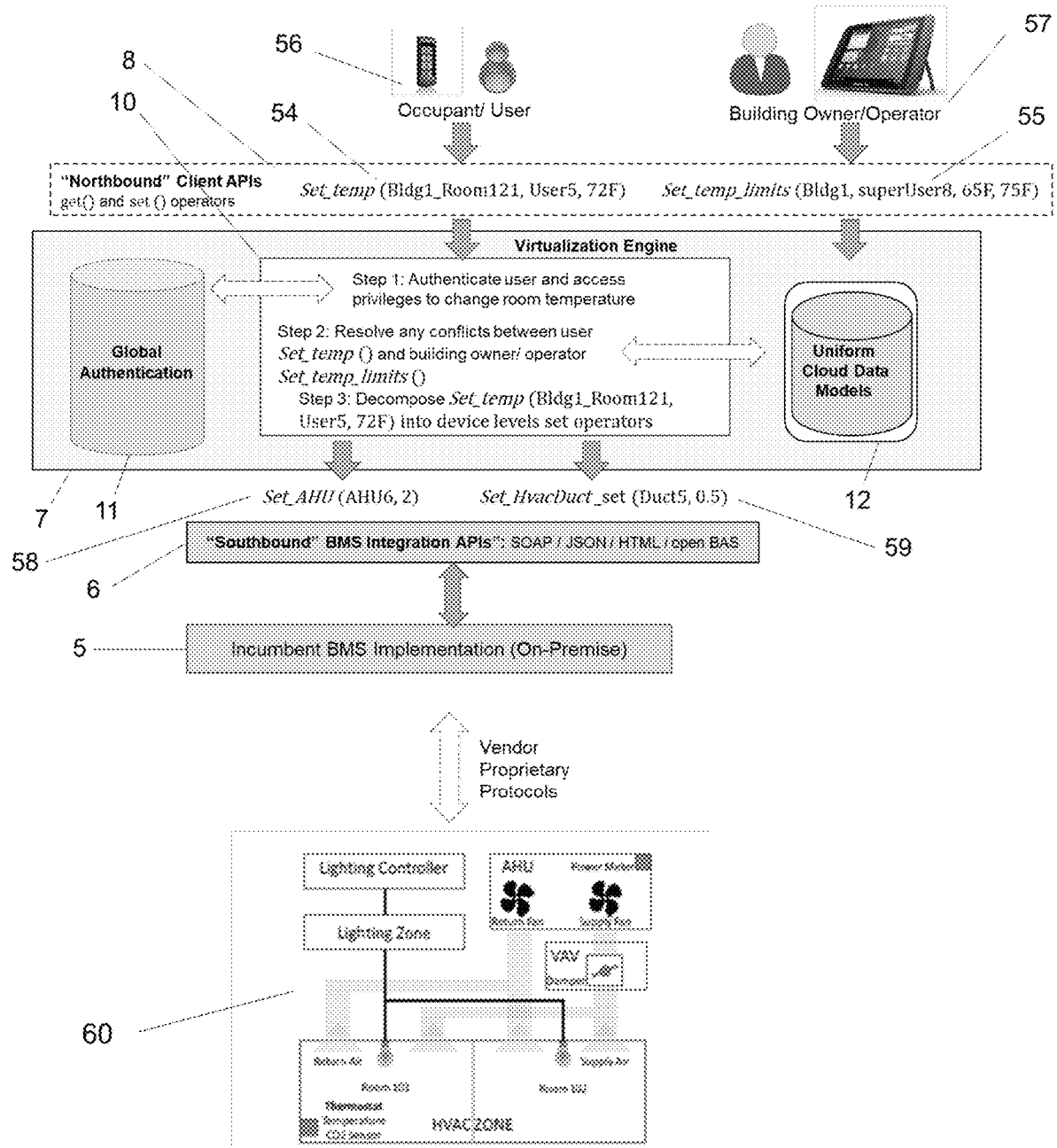
FIG. 12 illustrates sample execution APIs with decomposition of API calls by the virtualization engine of GeoBMS.

A further description of the API calls Get( ) and Set( ) of item 27 and item 28 of FIG. 7 may be seen in the context of the temperature management by EnergyOptimizer in FIG. 12. FIG. 12 provides a sample execution of two Northbound APIs item 8 in the context of specific application commands carrying out the operations of EnergyOptimizer. Set_temp ( ) item 54 and Set_temp_limits( ) APIs item 55 published by GeoBMS Item 7 illustrate how the system enables a temperature configuration into the underlying BMS implementation item 5. As discussed above, the Controller Feedback module item 26 shown in FIG. 7 has an Execute Mode item 44 to commit optimized configurations (such as modified temperature settings item 45 or updated setpoints item 46) to the underlying BMS implementations item 5 for execution via information flows item 28 relayed through Southbound APIs item 6.

The Set_temp_limits( ) API Item 55 allows building managers to commit new configurations for temperature management including establishing/overriding/updating temperature policies for entire buildings or spaces within each building. The disclosure herein illustrates one syntax that may be used for the Set_temp_limits( ) operator item 55:
  API: Set_temp_limits( )
  Access Level: Building Manager (superUser)
  Temperature Setting: [Fixed Setpoint, Strict Temperature Range, Suggested Temperature Range]
  Inputs: superUserId, [facilityID, spaceID], lowerTempLimit, higherTempLimit
  Outputs: Boolean (Success/Failure); String (Comments)
  Description: Sets temperature policy for the building or smaller spaces within the building Hence, an instance of the syntax Set_temp_limits may be Set_temp_limits (Bldg1, superUser8, 65 F, 75 F) item 55 for constraining temperatures between 65- and 75-degrees Fahrenheit. Set_temp_limits( ) API need not be limited to strict range but may be applied to at least one of three states described above: Fixed Setpoints, Strict Temperature Ranges or Suggested Temperature Ranges.

The Set_temp( ) API Item 54 allows building occupants and other users (such as commercial tenant managers or employees with assigned office spaces) to request temperature changes to the spaces they occupy or spaces that they are assigned, while being constrained within any Set_temp_limits( ) item 55 previously committed. In one example, the occupant (User5) Item 56 uses the Set_temp( ) API item 54 to request his room (Room 121 in Bldg. 1) to be set to 72° F.

Within the EnergyOptimizer application, the set_temp( ) operator is defined as follows:
API: Set_temp( )
Access Level: Occupant
Inputs: requestingUserId, spaceID, tempSetting
Outputs: Boolean (Success/Failure); String (Comments)
Description: Requests room temperature settings The virtualization engine item 10 performs a three-step operation to translate calls from the Northbound APIs item 8 into executable calls for Southbound APIs item 6 by executing the temperature change requested by the user into HVAC heater/chiller and air duct controller configuration settings that will achieve the desired temperature conditions.

Step 1: Confirms validity of user requests. In the example shown in FIG. 12, the global authentication engine item 11 validates that User5 item 56 is indeed a registered user and has access privileges to change the room temperature for Room 121 in Building 1.

Step 2: Checks that the requested temperature of 72° F. is in fact within the set temperature policies. In this case example, the building operator superUser 8 item 57 had previously executed a Set_temp_limits( ) operation item 55 to set a "Strict Temperature Range" of between 65° F. and 75° F. for office spaces in Building 1. This information is stored in Uniform Cloud Data Model item 12. The user requested temperature of 72° F. is thus within the building policy.

Step 3: Translates the valid API request into BMS-specific device operations by GeoBMS Item 10 as shown in FIG. 12. The Set_temp( ) operator is decomposed into two (of the many) HVAC parameters: (I) temperature of the forced air and (ii) air flow volumes as defined by duct controllers. The Set_temp( ) API decomposes into device level operations to achieve the room temperature settings. Specifically, Set_AHU( ) sets the fan speed of Air Handling Unit 6 to 2 item 58 while Set_HvacDuct( ) item 59 opens the duct controller vane for Duct 5 to half open (0.5).

These generic device operations, performed by GeoBMS item 10 decomposing commands from Northbound APIs item 8 and relaying the decomposed vendor-specific commands to the "Southbound" BMS integration AP item 6. The incumbent BMSs item 5 then receives the commands and executes configuration changes into the devices within the building item 60.

The above description is included to illustrate the operation of preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

The invention claimed is:

1. A system, comprising:
a plurality of building systems comprising a first set of building systems and a second set of building systems, wherein the first set of building systems and the second set of building systems are associated with a first set of buildings and a second set of buildings, respectively;
a plurality of building management systems (BMSs) comprising a first BMS and a second BMS, wherein the plurality of BMSs are configured to receive first building commands, and wherein the first BMS is coupled with the first set of building systems, and the second BMS is coupled with the second set of building systems;
a plurality of southbound application programming interfaces (APIs) that are configured to:
deploy the first building commands that are received by the plurality of BMSs; and
receive second building commands from the plurality of BMSs,
wherein each southbound API of the plurality of southbound APIs is coupled with a corresponding BMS of the plurality of BMSs,
and wherein each southbound API of the plurality of southbound APIs is associated with a corresponding BMS vendor of a plurality of BMS vendors;
a processor coupled with the plurality of southbound APIs to access and virtualize the plurality of BMSs, wherein the processor is remote from the plurality of BMSs, and wherein the processor is configured to:
receive the second building commands from the plurality of southbound APIs;
translate the second building commands into first higher-order application input commands;
receive second higher-order application output commands;
translate the second higher-order application output commands to the first building commands, wherein the first building commands comprise first vendor-specific commands and second vendor-specific commands; and
deploy the first building commands to the plurality of southbound APIs, wherein the first BMS and the first set of building systems are managed based on the first vendor-specific commands, and the second BMS and the second set of building systems are managed based on the second vendor-specific commands; and
a set of northbound APIs coupled with the processor, wherein the set of northbound APIs is configured to:
receive the first higher-order application input commands from the processor; and
deploy the second higher-order application output commands to the processor, wherein the second higher-order application output commands are agnostic to particulars of the plurality of BMSs,
wherein the second higher-order application output commands are associated with a plurality of applications, and
wherein the plurality of applications are created based on at least one of the first higher-order application input commands and an application request.

2. The system of claim 1, wherein the second building commands are translated into the first higher-order application input commands using a higher-order language that is formed from at least one data manipulation operator and at least one data definition operator.

3. The system of claim 2, wherein the data manipulation operator enables the processor to add at least one new hardware device in the plurality of building systems, remove at least one device from the plurality of building systems, configure changes associated with the plurality of BMSs based on the removal of the at least one device, and update databases of the processor with respect to addition or removal of users such as tenants and building operators and/or access privileges of the tenants and the building operators to access the plurality of BMSs.

4. The system of claim 2, wherein the data definition operator enables the processor to add a new building or remove an existing building in the first and second sets of buildings, create dynamic operational data associated with the addition of the new building, remove data associated with the removal of the existing building, install a new API library to interact with a new BMS of a new vendor or a new version provided by the new vendor for the new BMS, expand at least one BMS of the plurality of BMSs to the new vendor or to the new version by executing a language translation dictionary to translate the second higher-order application output commands into commands that are compatible with a new southbound API provided by the new vendor.

5. The system of claim 1, wherein the processor comprises a multi-stakeholder authentication module and a building information module.

6. The system of claim 5, wherein the multi-stakeholder authentication module comprises at least one rule to resolve conflict among multiple stakeholders associated with the first and second sets of buildings.

7. The system of claim 5, wherein the building information module performs at least one of the following tasks:
fetches building information from the plurality of BMSs by way of the second building commands; and
stores the fetched building information.

8. The system of claim 1, further comprising a building management applications layer item that is coupled with the set of northbound APIs, wherein the building management applications layer item is further configured to receive the first higher-order application input commands from the set of northbound APIs and provide the second higher-order application output commands to the set of northbound APIs, and wherein the plurality of applications include energy management, evacuation services, and lighting control management.

9. The system of claim 1, wherein the processor is further configured to abstract proprietary vendor interfaces from the plurality of southbound APIs into a single interface, wherein the single interface is deployed via the set of northbound APIs, and wherein to virtualize the first BMS, the processor is further configured to determine an API library item for a version and a vendor of the first BMS to translate the second-higher order application output commands to the first vendor-specific commands, add or remove devices and users associated with the first BMS, and/or modify access privileges of the users.

10. The system of claim 1, further comprising a service development item that is external to the processor, wherein the service development item is configured to create and test new services that are to be deployed via the set of northbound APIs to the processor and further to the plurality of BMSs by way of the plurality of southbound APIs.

11. The system of claim 1, wherein to access the plurality of BMSs, the processor comprises first and second components, wherein the first component comprises an API set library, wherein the API set library includes a specific API library for each version of a BMS of the plurality of BMSs, wherein each library of the API set library is provided by a vendor that provides a corresponding BMS of the plurality of BMSs and a corresponding southbound API of the plurality of southbound APIs associated with the corresponding BMS, and wherein the second component includes drivers for integrating the processor with a specific API library of the API set library.

12. The system of claim 1, wherein the plurality of building systems comprise building subsystems and devices that include hardware controllers, thermostats, and sensors.

13. The system of claim 1,
(i) wherein the second higher-order application output commands are translated into the first building commands by decomposing the second higher-order application output commands into the first vendor-specific commands and the second vendor-specific commands,
(ii) wherein at least one configuration change is executed in at least one of the first BMS and/or at least one building system of the first set of building systems based on the first vendor-specific commands, and at least one configuration change is executed in at least one of the second BMS and/or at least one building system of the second set of building systems based on the second vendor-specific commands, and
(iii) wherein the first vendor-specific commands and the first BMS are associated with a first BMS vendor of a plurality of BMS vendors, and the second vendor-specific commands and the second BMS are associated with a second BMS vendor of the plurality of BMS vendors.

14. The system of claim 13,
(i) wherein the plurality of southbound APIs comprise a first southbound API and a second southbound API that are coupled with the first BMS and the second BMS, respectively,
(ii) wherein the first southbound API deploys the first vendor-specific commands to the first BMS, and the second southbound API deploys the second vendor-specific commands to the second BMS, and
(iii) wherein the first southbound API is associated with the first BMS vendor, and the second southbound API is associated with the second BMS vendor.

15. The system of claim 14, wherein the second building commands comprise first building inputs and second building inputs, wherein the processor receives the first building inputs from the first southbound API and the second building inputs from the second southbound API, and wherein the first southbound API receives the first building inputs from the first BMS, and the second southbound API receives the second building inputs from the second BMS.

16. A method comprising:
accessing, by a processor, a plurality of building management systems (BMSs) via a plurality of southbound application programming interfaces (APIs), wherein the processor is remote from the plurality of BMSs,
wherein each southbound API of the plurality of southbound APIs is coupled with a corresponding BMS of the plurality of BMSs, wherein each southbound API is associated with a corresponding BMS vendor of a plurality of BMS vendors, and
wherein a first BMS of the plurality of BMSs is coupled with a first set of building systems associated with a first set of buildings, and a second BMS of the plurality of BMSs is coupled with a second set of building systems associated with a second set of buildings;
receiving, by the processor, first building commands from the plurality of southbound APIs, wherein the first building commands are associated with the plurality of BMSs;
translating, by the processor, the first building commands into first higher-order application input commands;
deploying, by the processor, the first higher-order application input commands to a set of northbound APIs;

receiving, by the processor, second higher-order application output commands from the set of northbound APIs, wherein the second higher-order application output commands are agnostic to particulars of the plurality of BMSs,
  wherein the second higher-order application output commands are associated with a plurality of applications, and
  wherein the plurality of applications are created based on at least one of the first higher-order application input commands and an application request;
translating, by the processor, the second higher-order application output commands to second building commands, wherein the second building commands comprise first vendor-specific commands and second vendor-specific commands; and
deploying, by the processor, the second building commands to the plurality of southbound APIs, wherein the second building commands are received by the plurality of BMSs, and wherein the first BMS and the first set of building systems are managed based on the first vendor-specific commands, and the second BMS and the second set of building systems are managed based on the second vendor-specific commands.

17. The method of claim 16, wherein the step of translating the first building commands into the first higher-order application input commands further comprises:
  using at least one data manipulation operator and at least one data definition operator, to construct a higher order language.

18. The method of claim 16, wherein translating the second higher-order application output commands into the second building commands comprises decomposing the second higher-order application output commands into the first and second vendor-specific commands, and wherein the first vendor-specific commands and the first BMS are associated with a first BMS vendor of a plurality of BMS vendors, and the second vendor-specific commands and the second BMS are associated with a second BMS vendor of the plurality of BMS vendors.

19. The method of claim 18, wherein a first southbound API of the plurality of southbound APIs and a second southbound API of the plurality of southbound APIs provide the first vendor-specific commands and the second vendor-specific commands to the first BMS and the second BMS, respectively, and wherein the first southbound API is associated with the first BMS vendor, and the second southbound API is associated with the second BMS vendor.

20. The method of claim 16, wherein at least one configuration change is executed in at least one of the first BMS and/or at least one building system of the first set of building systems based on the first vendor-specific commands, and at least one configuration change is executed in at least one of the second BMS and/or at least one building system of the second set of building systems based on the second vendor-specific commands.

* * * * *